(12) United States Patent
Weibel et al.

(10) Patent No.: US 11,972,275 B1
(45) Date of Patent: Apr. 30, 2024

(54) LAYERED FUNCTIONAL AND GRAPHICAL USER INTERFACE SYSTEM

(71) Applicant: Salesforce, Inc., San Francisco, CA (US)

(72) Inventors: Alan Weibel, San Francisco, CA (US); Brandon Ferrua, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/103,411

(22) Filed: Jan. 30, 2023

(51) Int. Cl.
G06F 9/451 (2018.01)
G06F 8/36 (2018.01)

(52) U.S. Cl.
CPC .............. G06F 9/451 (2018.02); G06F 8/36 (2013.01)

(58) Field of Classification Search
CPC .................................. G06F 9/451; G06F 8/36
See application file for complete search history.

(56) References Cited

U.S. PATENT DOCUMENTS

| | | | |
|---|---|---|---|
| 9,223,549 B1 * | 12/2015 | Hermanns | G06F 9/451 |
| 2003/0225829 A1 * | 12/2003 | Pena | G06F 16/957 707/E17.119 |
| 2004/0098733 A1 * | 5/2004 | Bjare | G06F 9/44526 719/328 |
| 2014/0035945 A1 * | 2/2014 | Anglin | G06F 3/14 345/619 |
| 2017/0220641 A1 * | 8/2017 | Chi | G06F 9/451 |
| 2020/0133642 A1 * | 4/2020 | Payne | G06F 8/38 |

* cited by examiner

Primary Examiner — Jennifer N Welch
Assistant Examiner — Kuang F Chen
(74) Attorney, Agent, or Firm — Butzel Long

(57) ABSTRACT

A computer-implemented method for providing user interface functionalities is disclosed. The method includes providing a base design system layer including web browser components providing platform-agnostic user interface functionalities, an application programming interface (API) that extends the base design system layer into a second design system layer providing platform-specific user interface functionalities, inheriting and extending extensible APIs from the second design system layer, building a third design system layer using the extensible APIs, providing product-specific user interface functionalities using the third design system layer, inheriting and extending extensible APIs from the second design system layer, building a fourth design system layer using the extensible APIs, and providing presentation-specific user interface functionalities using the fourth design system layer. The method also includes integrating the base design system layer, the second design system layer, the third design system layer and the fourth design system layer into a user interface framework.

16 Claims, 7 Drawing Sheets

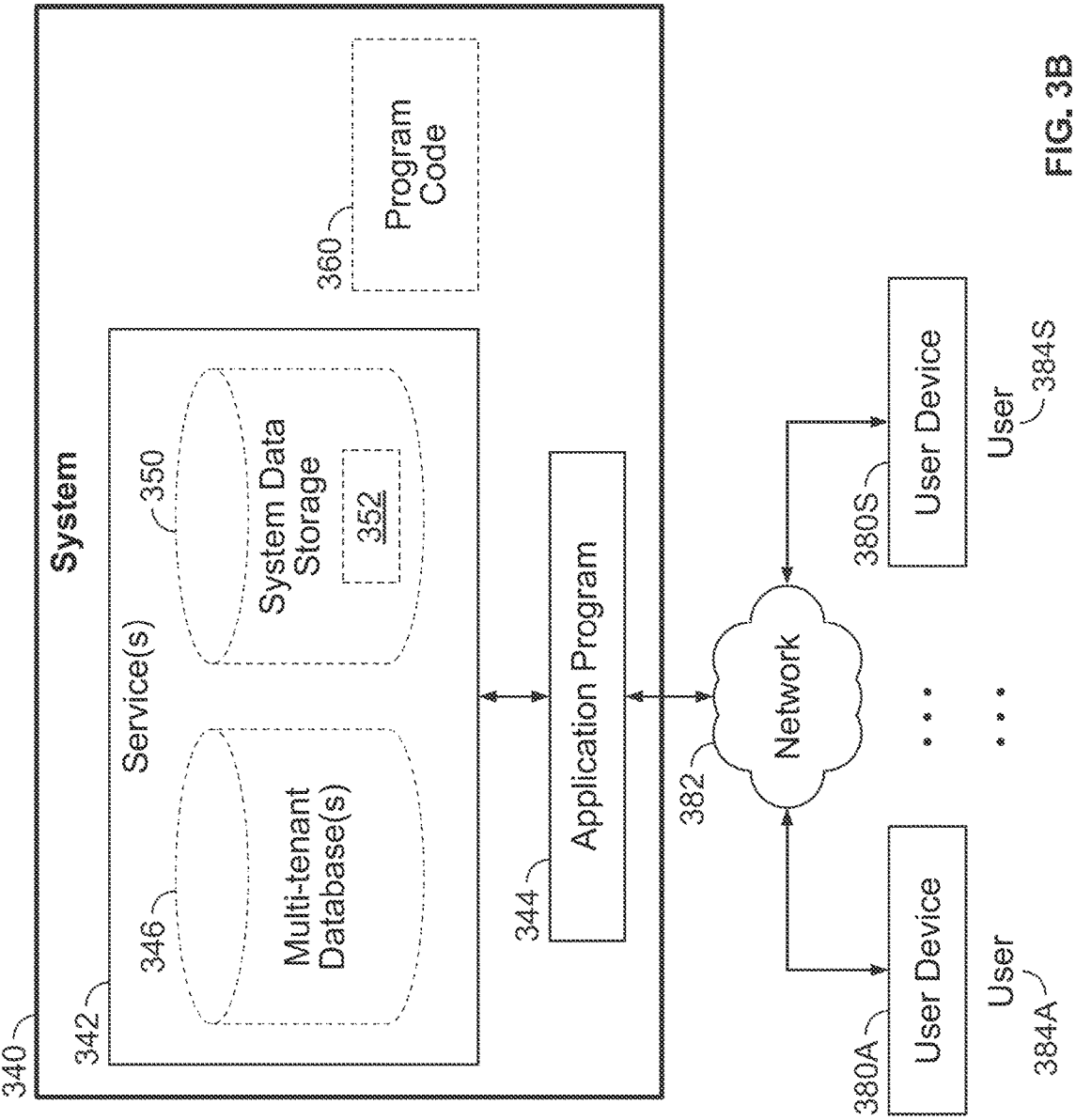

LAYERED FUNCTIONAL AND GRAPHICAL USER INTERFACE SYSTEM

BACKGROUND

The present disclosure relates to a modular framework for providing enterprise-specific user interface functions. Web platforms that are designed to serve multiple industries and customers with differing user interface needs often are difficult for customers, as users, to customize for their specific functions and appearances. Such customization efforts are typically associated with wide-scale undoing/redoing/reworking of the default user interface properties provided with the platforms.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 3B is a block diagram illustrating an example deployment environment according to an example implementation.

DETAILED DESCRIPTION

Figure 1A:
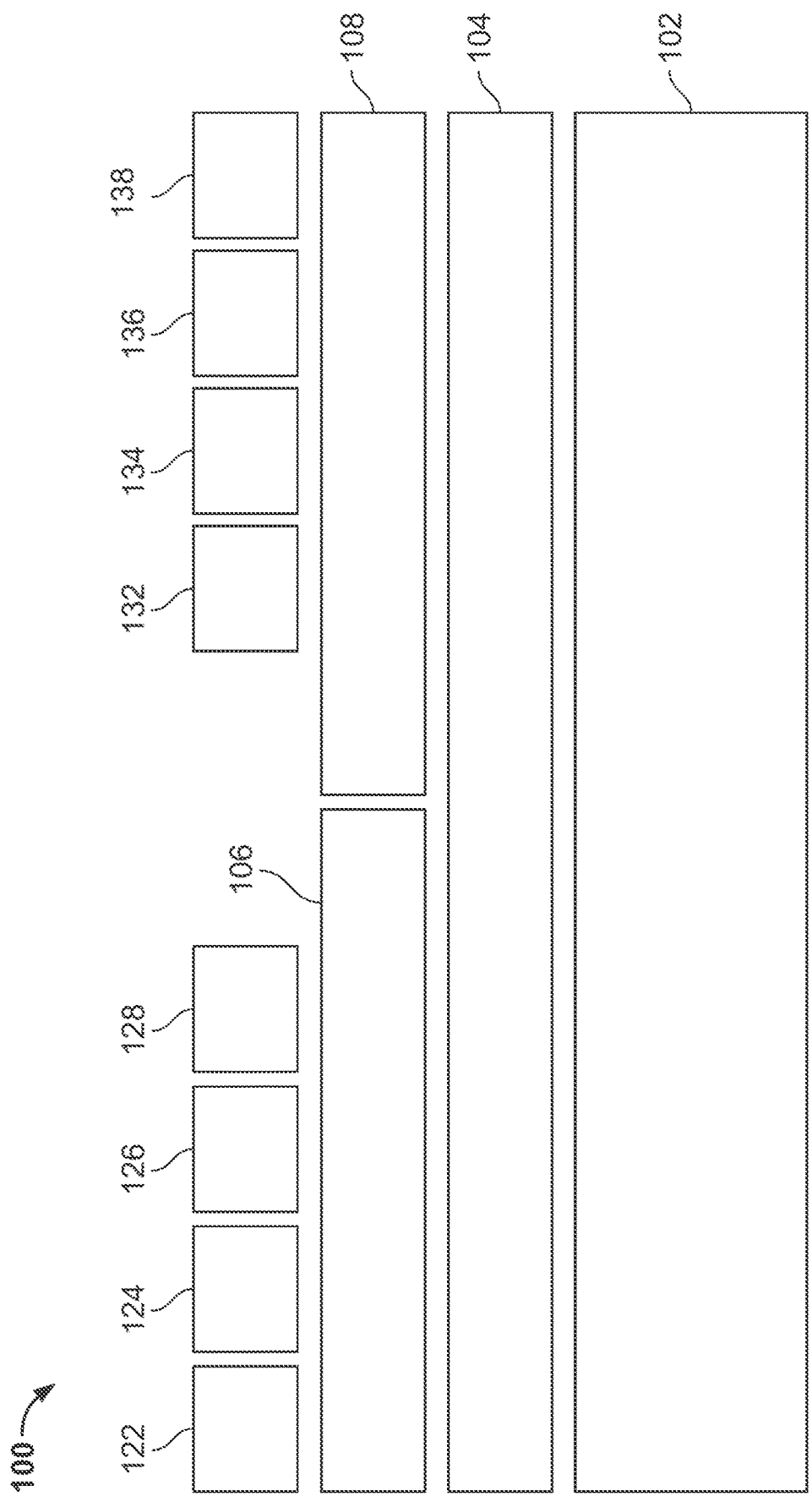
FIG. 1A is a block diagram illustrating an example system for providing a graphical user interface.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

The present disclosure provides a modular framework for providing enterprise-specific user interface functions. Platforms, such as Salesforce, Amazon, Azure and the like are designed to serve multiple industries and customers with differing user interface needs. These platforms often are difficult for customers, as users, to customize for their specific functions and appearances. Such customization efforts are typically associated with wide-scale undoing, redoing, and/or reworking of the default user interface properties provided with the platforms. For example, a customer of a hosted platform may want to customize the appearance of each interface component to achieve a consistent, uniform "look and feel" across all their applications, websites and the like. However, hosted application platforms often mix appearance, functionality, and presentation components, which in turn requires the customer to change the properties and/or functionality of each component separately. This process often must be repeated every time a new interface is created, added from a template, or modified, or when changes to either functionality or appearance are desired, which normally would not impact the other. As such, customizing interface components of conventional hosted application platforms may require a good deal of custom work by the customer.

Embodiments disclosed herein provide a flexible graphical user interface system that allows customers to configure their own user interface (UI) components without having to rework the platform specific UI properties. The system uses several design system "layers" built up from bottom to top, in a parent-child relationship. Child layers at the top address product features and presentation aspects and inherit extensible APIs from the parent layers, at the bottom, which provide functional aspects. The layers are structurally decoupled from one another other than via the API calls, so users do not need to adjust components or layers other than those specifically related to appearance/functionality changes needed to customize the default look and feel.

In an aspect of the disclosed subject matter, a computer-implemented method is disclosed for providing user interface functionalities. The computer-implemented method may include providing a base design system layer including a collection of web browser components that provide platform-agnostic user interface functionalities, and providing an application programming interface (API) that extends the base design system layer into a second design system layer. The second design system layer provides a collection of platform-specific user interface functionalities. The computer-implemented method may also include inheriting and extending a second collection of extensible APIs from the second design system layer, building a third design system layer using the collection of extensible APIs, providing a collection of product-specific user interface functionalities using the third design system layer, and inheriting and extending a third collection of extensible APIs from the second design system layer. The computer-implemented method may also include building a fourth design system layer using the third collection of extensible APIs, and providing a collection of presentation-specific user interface functionalities using the fourth design system layer. The computer-implemented method may further include integrating the base design system layer, the second design system layer, the third design system layer and the fourth design system layer into a user interface framework.

The base design system layer, the second design system layer, the third design system layer and the fourth design system layer are structurally decoupled and encapsulated from one another The computer-implemented method may also include providing a collection of unstyled and functional base web components, a collection of styling hooks, and a collection of APIs, and styling the base design system layer using the collection of unstyled and functional base web components, the collection of styling hooks, and the collection of APIs.

The computer-implemented method may further include providing a collection of platform specific web components, a second collection of styling hooks and a second collection of APIs, and styling the second design system layer using the collection of platform specific web components, second collection of styling hooks and the second collection of APIs.

The computer-implemented method may further include providing a collection of patterns, components, tokens, and guidelines, and styling the third design system layer using the collection of patterns, components, tokens, and guidelines.

The computer-implemented method may also include providing a second collection of patterns, components, tokens, and guidelines, and styling the fourth design system layer using the second collection of patterns, components, tokens, and guidelines.

A design flexibility and an extent of design customization of the user interface framework reduces from the base design system layer to the second design system layer to the third design system layer, and to the fourth design system layer.

The computer-implemented method may further include integrating the base design system layer, the second design system layer, the third design system layer and the fourth design system layer into the user interface framework using a scripting framework that includes a collection of API services. The collection of API services includes web component APIs, extensible APIs, standard APIs, styling APIs, and platform specific APIs.

In an aspect of the disclosed subject matter, a system is disclosed for providing a graphical user interface. The system includes one or more computer processors configured to provide a base design system layer including a collection of web browser components that provide platform-agnostic user interface functions and a second design system layer including a collection of extensible APIs inherited from the base design system layer that provide a collection of platform-specific user interface functions. The one or more computer processors are also configured to provide a third design system layer including a second collection of extensible APIs inherited from the second design system layer that provides a collection of product-specific user interface functions, and a fourth design system layer including a third collection of extensible APIs inherited from the second design system layer that provides a collection of presentation-specific user interface functions.

FIG. 1A is a block diagram illustrating the logical structure 100 of a graphical user interface system as disclosed herein. Each layer or component may be provided by one or more computer processors configured to provide any number of the design system and subsystem layers shown. Referring to FIG. 1A, the system 100 includes a base design system layer 102 that includes a number of web browser components that provide platform-agnostic user interface functions. The web browser components of the base design system layer 102 may include custom elements, shadow DOM (Document Object Model), ES Modules (European Computer Manufacturers Association Script Modules), HTML (HyperText Markup Language) templates and the like. Further, the base design system layer 102 may also include standard APIs for providing functional requirements such as part replacement, application opening or closing management, attribute management, focus management, position management and the like.

The system 100 includes a second design system layer 104 that includes a collection of extensible APIs inherited from the base design system layer 102. The extensible APIs may include platform APIs and component APIs, and provide a number of platform-specific user interface functions, such as ergonomics, browser compatibility and the like.

"Inheritance", as used above and throughout this disclosure, is a mechanism that allows one class of components or programs to gain the properties of another class, in the same way, that children inherit some of their attributes from their parents. Inheritance allows programmers to create new components that reuse the data members and methods of existing components.

Referring back to FIG. 1A, the system 100 includes a third design system layer 106 that is typically meant for business users of the product and/or customers who have already purchased the product and thus are already aware of, and likely familiar with, the utility of the first two design system layers. The third design system layer 106 includes a second collection of extensible APIs inherited from the second design system layer 104. The second collection of extensible APIs provide a number of product-specific user interface functions, such as sales 122, service 124, platform 126, analytics 128 and the like.

The system 100 includes a fourth design system layer 108 that typically is meant for education and enablement, for example of prospective customers. The fourth design system layer 108 may provide easy-to-use add-on branding and marketing materials that may help the customers apply their own "look and feel" to the final product, or may help potential customers appreciate the flexibility of the underlying software product offerings in terms of adaptable visual appearance, such as for branding purposes. The fourth design system layer 108 includes a third collection of extensible APIs that are inherited from the second design system layer 104 and designed to address the needs of the such customers. These customers typically are characteristically different from the customers of the user interface functions of the third design system layer 106. The third collection of extensible APIs provide a number of presentation-specific user interface functions, such as learning management system 132, application marketplace 134, product enhancement forum 136 for upvoting or downvoting the product enhancements, user help and training 138 and the like.

The base design system layer 102, the second design system layer 104, the third design system layer 106 and the fourth design system layer 108 are structurally decoupled and encapsulated from one another.

"Encapsulation", as used above and through the present disclosure, refers to bundling of data, along with the methods that operate on the data, into a single unit. Encapsulation is a way to restrict direct access to some components of a particular object, so that users cannot access state values of all the variables of the object. Encapsulation may be used to hide both data members and data functions, as well as methods associated with an instantiated class or object. A key benefit of hiding and protecting information about attributes and methods using encapsulation, as implemented in the base design system layer 102, the second design system layer 104, the third design system layer 106 and the fourth design system layer 108 of FIG. 1A, is that it prevents other developers from writing scripts or APIs that use the original code.

A "decoupled architecture", as is commonly known in the art, is a development framework that allows components to remain autonomous and unaware of each other, and at the same time, to perform their tasks independently.

A traditional architecture is coupled and monolithic, wherein an entire technology stack (front-end and back-end) exists as one cohesive codebase sharing the same resources. Traditional approaches provide the administrators an apparent advantage of being able to work within a single system.

The consequence of this cohesiveness, however, is a sort of "butterfly effect" in which seemingly innocuous changes in one part of the system may cause a significant and unintended impact elsewhere in the system. Developers commonly use a term "brittle" to describe a codebase that lacks flexibility and resists efforts to adapt, evolve or otherwise change in a meaningful way. Traditional architecture has an inherent tendency towards brittleness.

In a decoupled web architecture, on the other hand, front-end and back-end codebases are separate, with no shared resources. The two codebases communicate, but each has its own server instance. The back-end application serves data via an API (application programming interface) using a framework such as JSON (JavaScript Object Notation). A decoupled approach is advantageous for facilitating changes, enabling individual services and the components to be independently scaled up or down or removed entirely without disrupting the entire application. Developers, in general, prefer the decoupled approach as it tends to remove production bottlenecks, simplify testing and provide for an easily reusable back-end codebase.

Referring to the present embodiment, decoupling of the base design system layer 102, the second design system layer 104, the third design system layer 106, and the fourth design system layer 108 allows front-end and back-end developers to optimize their systems or sub-systems or design layers without the risk of customization and extension efforts in one part impacting the rest of the system. Separating the front-end and the back-end codebases enables each to be designed and maintained optimally. The front-ends, such as the third design system layer 106 and the fourth design system layer 108 and the back-ends, such as the base design system layer 102 and the second design system layer 104 may communicate with one other using simple communications protocols and work synergistically with precision and efficiency. As a result, fast and flexible content delivery within a specified delivery environment becomes possible. Further, the decoupled architecture of system 100 provides rapid design iterations, simpler deployments, easy and secure third-party integrations, depending less on supporting information technology infrastructure.

Further, the system 100 of FIG. 1A, in effect, may function as a rendering library that decouples one or more view layers and divide them into numerous finer layers, such as the third design system layer 106, and the fourth design system layer 108. The resulting multi-layered views combine both unique, user-specific visual appearance, and shared styling for the benefit of their end users. Furthermore, the multi-layered views may provide broad flexibility on the view layer and, at the same time, retain all common functionalities provided in the base design system layer 102 and the platform specific design system layer 104.

A "web component", as used herein, is a reusable custom element with its functionality encapsulated away from the rest of the code and a "web component API" provides an interface to one or more web components. "Base web components" are foundational and functional web components built on a web platform. "Base platform-specific web components" are web components built with platform-specific design system HTML and platform-specific APIs. "Styling hooks" are interfaces in which customers may customize the visual properties of their components. A "design system" is a collection of repeatable design patterns and code used to create a consistent user experience across a system at scale. A "sub-system" is a design system for a collection of products that share similar experiences. "Tokens" are platform-specific style values that work across screens and devices for native web and mobile, keeping styles in sync. "Kinetics" is a platform specific brand as it is expressed through motion in web and product.

Figure 1B:
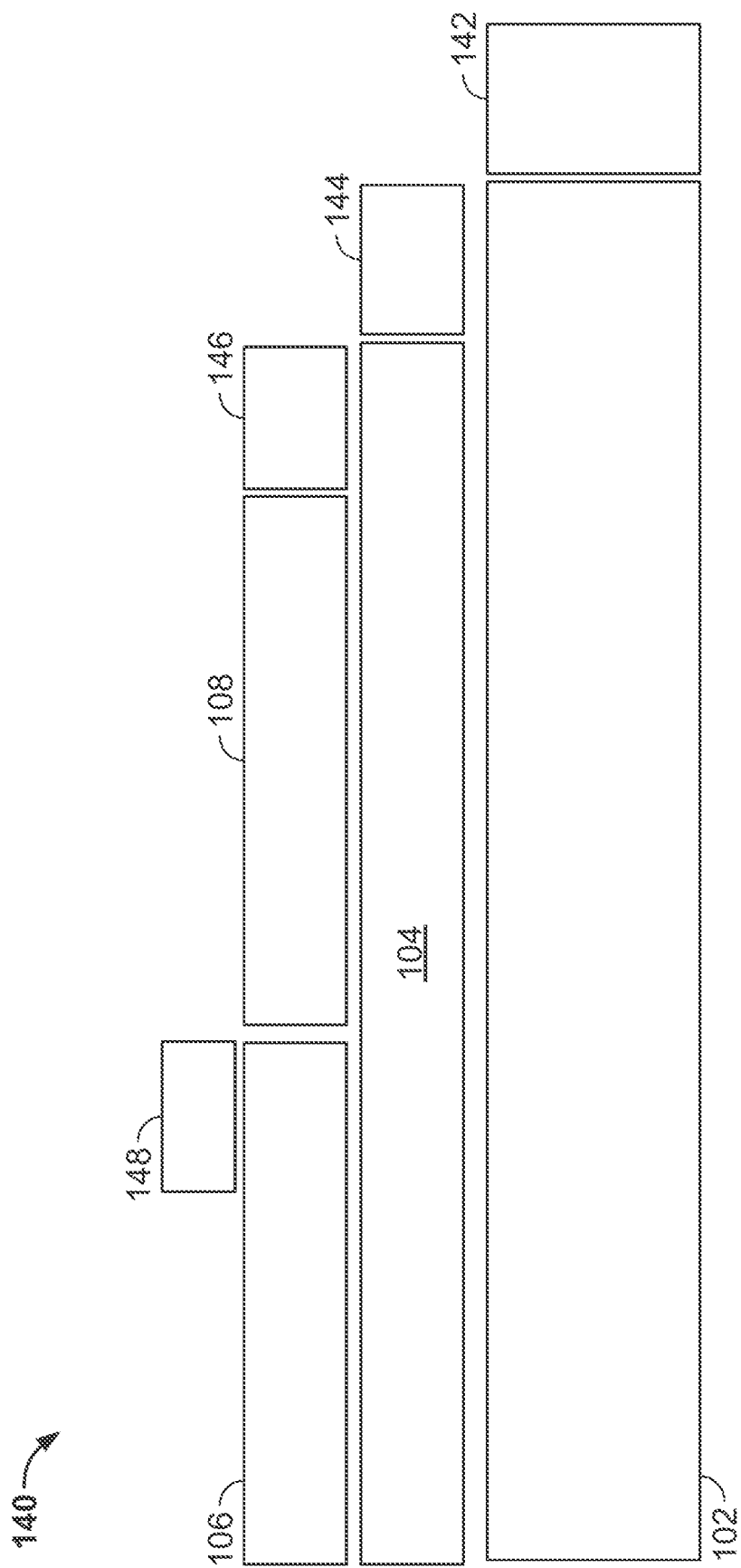
FIG. 1B is a block diagram illustrating an example scripting framework provided for the system of FIG. 1A.

FIG. 1B is a block diagram illustrating an example scripting framework 140 that includes a collection of API services that call functions of the base design system layer 102, the second design system layer 104, the third design system layer 106 and the fourth design system layer 108 into the user interface framework 100 of FIG. 1A and thereby selectively implements a number of customization and feature extension aspects. The scripting framework 140 is typically owned by cloud service providers and platform and digital delivery communities. Structural details of the scripting framework 140 depend on business requirements and provide syntactic synergies that make implementations easy for the users or customers. The scripting framework 140 includes a number of product specific APIs and provides a path for full platform integration through stages of extensions.

Referring to FIG. 1B, the base design system layer 102 includes a collection 142 of unstyled base web components, a collection of styling hooks, and a collection of APIs 142 configured to style the collection of unstyled base web components via the collection of styling hooks, providing integration and security. In an instance, customers may want to use the foundational web components and then build their own system on top of the foundation. Such customization and feature extension may be accomplished using the scripting framework 140 of FIG. 1B and a component architecture of FIG. 1C (described below).

The second design system layer 104 includes a collection 144 of platform specific web components, a second collection of styling hooks, and a second collection of APIs configured to style the collection of platform specific web components via the second collection of styling hooks. In an instance, customers may want to use the platform provided design system but may not want to build their systems on the platform provided. Such customization and feature extension may be accomplished using the scripting framework 140 of FIG. 1B and the component architecture of FIG. 1C.

The third design system layer 106 includes a collection 146 of patterns, components, tokens, and guidelines configured to provide the collection of product-specific user interface functionalities. In an instance, customers may want to use the providers' platforms but may not exactly want to instantiate the features of the products, as provided by the platform. Such customization and feature extension may be accomplished using the scripting framework 140 of FIG. 1B and the component architecture of FIG. 1C.

The fourth design system layer 108 also includes a collection 148 of patterns, components, tokens, and guidelines configured to provide a number of presentation-specific user interface functionalities. In an instance, customers may want to use the providers' platforms but may not exactly want to instantiate the look and feel of the product features or functions, as provided by the platform. Such customization and feature extension may be accomplished using the scripting framework 140 of FIG. 1B and the component architecture of FIG. 1C.

Referring to FIGS. 1A and 1B, the design flexibility and the extent of design customization of the user interface framework 100 reduces from the base design system layer 102 to the second design system layer 104 to the third design system layer 106, and to the fourth design system layer 108. In other words, the layers at the bottom are flexible and they may offer more scope of customization, while the layers at the top are rigid and may not be much customizable.

Typical usage patterns of the end customers provide a good example of the differences in flexibility and customization throughout the system layers. For example, referring to FIG. TA, the base design system layer 102 may have a skeletal structure of markup and functionality. Visually, styling aspects may not be present in the base design system layer 102 and many of the components may not be visible if they are rendered in a browser, without modification. The benefit of the base design system layer 102 is that it is agnostic to any application market, platform, user, or brand. Further, the base design system layer 102 progresses a customer's development efforts by providing a large extent of the development work pre-completed. The next layer, i.e., the platform-specific design system layer 104 adopts the base design system layer 102 and provides additional platform-specific integration and functionality. The consolidation of the base design system layer 102 and the platform-specific design system layer 104 enables the upper view layers, such as the third design system layer 106 and the fourth design system layer 108, to connect with the lower data layers, such as the third design system layer 106 and the fourth design system layer 108 securely so that data may be authentically rendered in the respective components.

Further, the upper layers, such as the third, the fourth, or even a fifth layer, may apply specific visual styling and interaction based on the preferences of the customers. For instance, the third layer of the system 100 may entail the shared visual design of the product whereas another layer on top of the third layer may include unique application-specific experiences for each of several separate applications, such as sales, service, analytics and the like. There may be shared experiences among these applications, such as common user interface flows, similar appearance, and the like, while at the same time each application may have its own specific experiences that may be integrated as needed. In one embodiment, a developer may go one step further, add an additional layer in the hierarchy of modification, and provide customized experiences for several distinct features within an application.

Figure 1C:
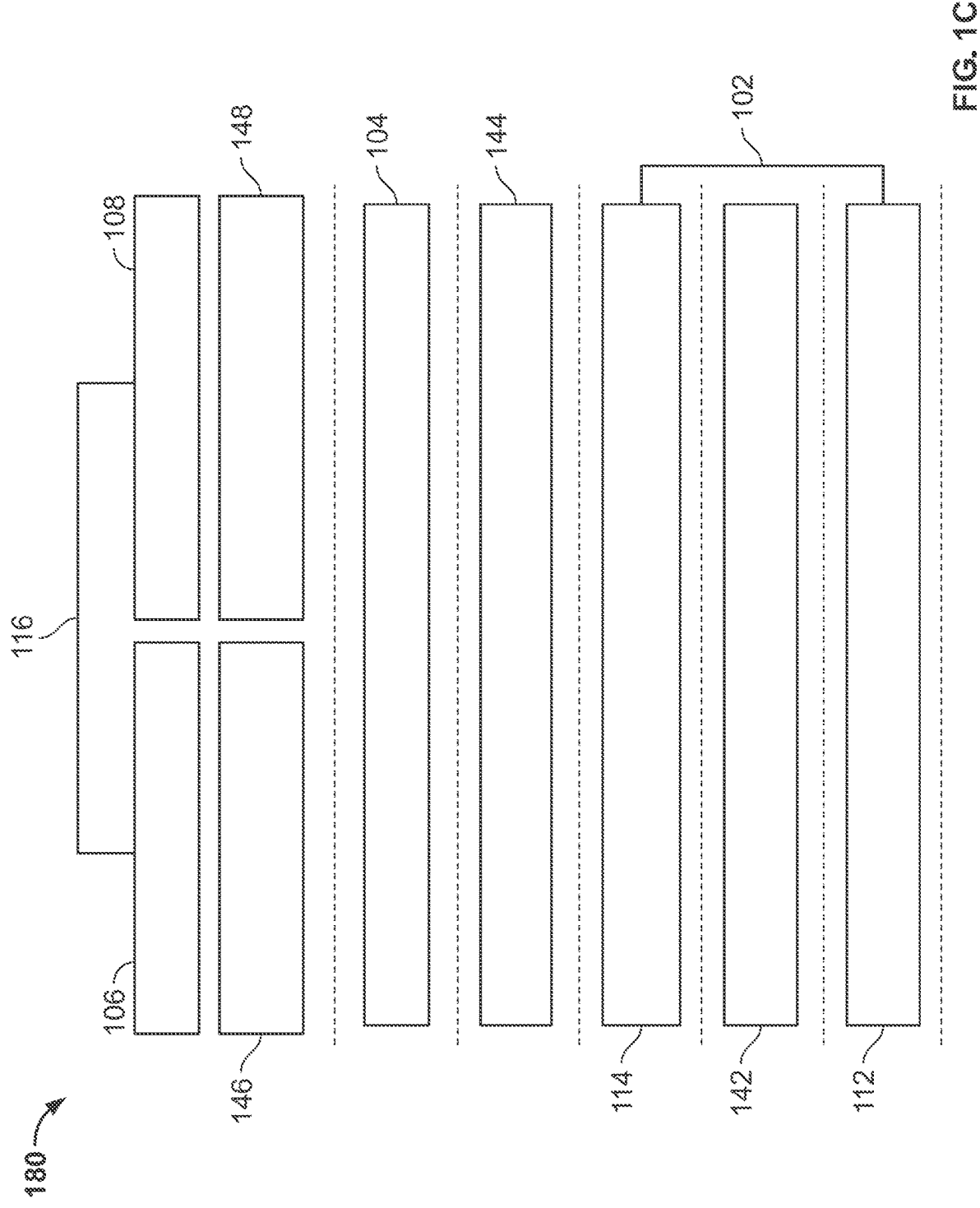
FIG. 1C is a block diagram illustrating an example component architecture provided for the system of FIG. 1A.

FIG. 1C is a block diagram illustrating a component architecture 180 provided for customization and extension of the features of the base design system layer 102, the second design system layer 104, the third design system layer 106, and the fourth design system layer 108 of FIGS. 1A and 1B.

At the bottom most level of the component architecture 180, there are web platform components 112 forming the foundation. The web platform components 112 may include native-quality web components, such as custom elements, shadow DOM, ES Modules, HTML templates and a comprehensive set of common mobile and desktop UI patterns. The web platform components 112 are designed by the designers and the engineers of the solution providing enterprise to accommodate basic variations in the design. The web platform components 112 are extensible but they do not provide built-in aesthetic styling.

Enumerated from the bottom, at the second level of the component architecture 180, there are base web components 114, extended from the web platform components 112 using the extensibility APIs 142 of FIG. 1B. Extensibility APIs 142 are typically deployed for defining a template, tracking state, and rendering state to the DOM (Document Object Model). In this instance, the base web components 114 include standard APIs for providing functional design requirements such as part replacement, application opening or closing management, attribute management, focus management, position management. The web platform components 112 and the base web components 114 constitute the base design layer 102 of FIGS. 1A and 1B.

Enumerated from the bottom, at the third level of the component architecture 180, there are platform specific APIs 104, extended from the base web components 114 using the styling APIs 144 of FIG. 1B. The styling APIs 144 may include enterprise-provided web components provided for styling using HTML, CSS, and telemetry functions. The platform specific APIs 104 may include component APIs and provide a number of platform-specific user interface functions, such as ergonomics, browser compatibility and the like. The platform specific APIs 104 may be built and owned by platform design system teams. The platform specific APIs 104 may function as common UI base web components shared across all properties of the platform. The platform specific APIs 104 are extensible and designed to accommodate variation and theming through design system styling hooks. They are typically developed using design guidelines and kinetic language provided for developing a platform's product landscape.

Enumerated from the bottom, at the fourth level of the component architecture 180, there is an experience layer 116 built and owned by cloud service providers and platform and digital delivery communities. The experience layer 112 includes the product experience layer 106 (of FIGS. 1A and 1B) and the presentation experience layer 108 (of FIGS. 1A and 1B). The product experience layer 106 is extended from the platform specific APIs 104 using product related components, styling hooks, platform specific patterns, guidelines and accessibility provisions 146 of FIG. 1B. In a similar manner, the presentation experience layer 108 is extended from the platform-specific APIs 104 using presentation related components, styling hooks, platform-specific patterns, guidelines and accessibility provisions 148 of FIG. 1B.

The experience layer 116 may be designed using product-specific and presentation-specific design guidelines, product-specific and presentation-specific kinetic language and product-specific and presentation-specific assets such as icons, fonts, images and the like. Specifically, the product experience layer 106 and the presentation experience layer 108 may be designed and maintained by the respective product or presentation teams, such as sales, customer relationship management (CRM), allied product suites and closely conform to customers' needs, wants and latent expectations. Overall, the experience layer 116 relates to experience-specific design systems, such as productivity, editorial and may include a full library of shared web components. Further, the experience layer 116 provides product and presentation features expressed as branded characteristics of the originating enterprises, such as Salesforce, Amazon, Azure and the like.

The multi-layered, parent-child design system 100 of FIG. 1A, the scripting framework 140 of FIG. 1B, and the component architecture 180 of FIG. 1C may provide a flexible, reusable, and extensible UI design and customization solution that may help an organization save human, computing, and financial resources. The elimination of rework and redesign reduces manual errors and increases the speed and agility of the system development process.

Figure 2A:
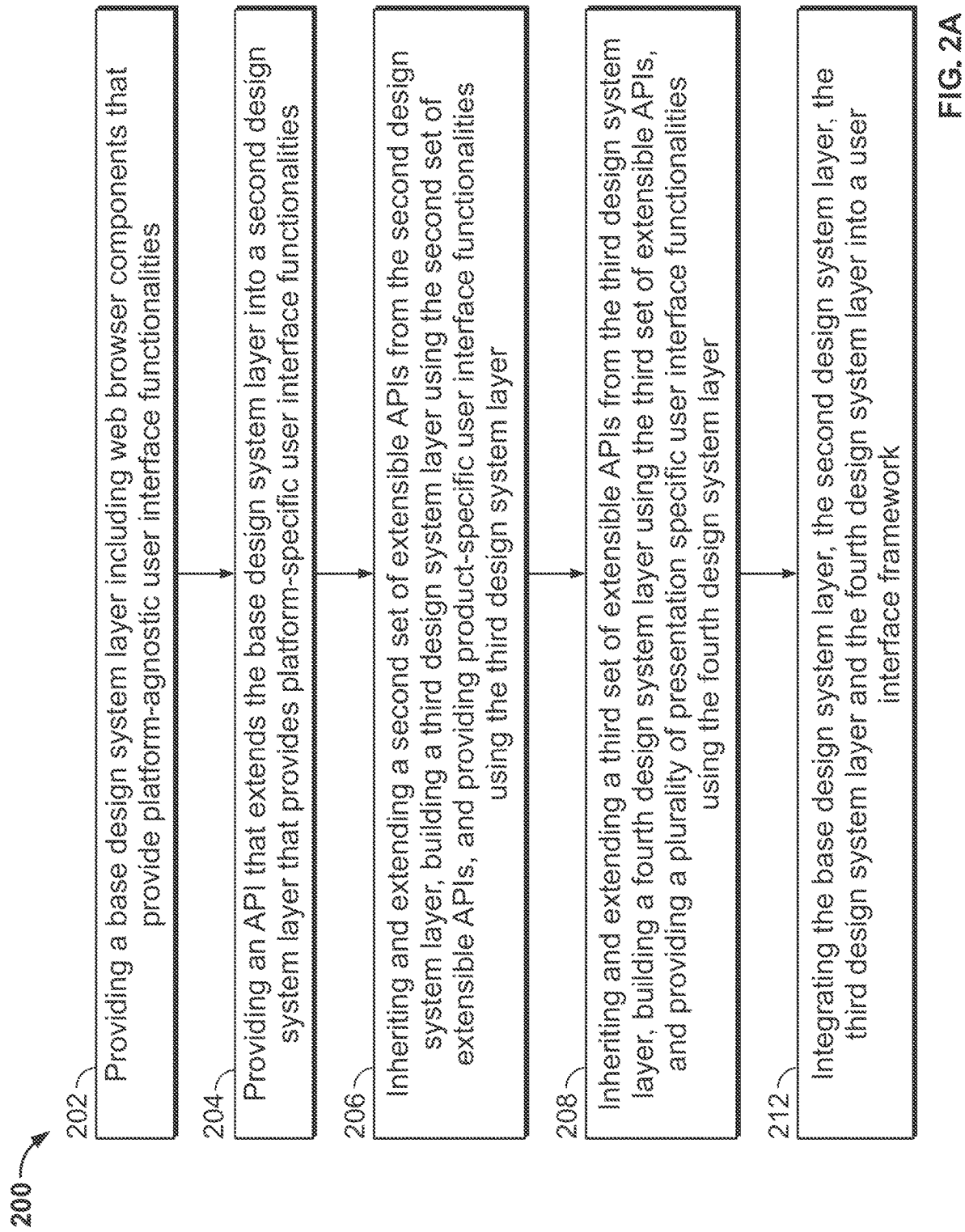
FIG. 2A is a flow diagram illustrating a method for providing user interface functionalities.
Figure 3A:
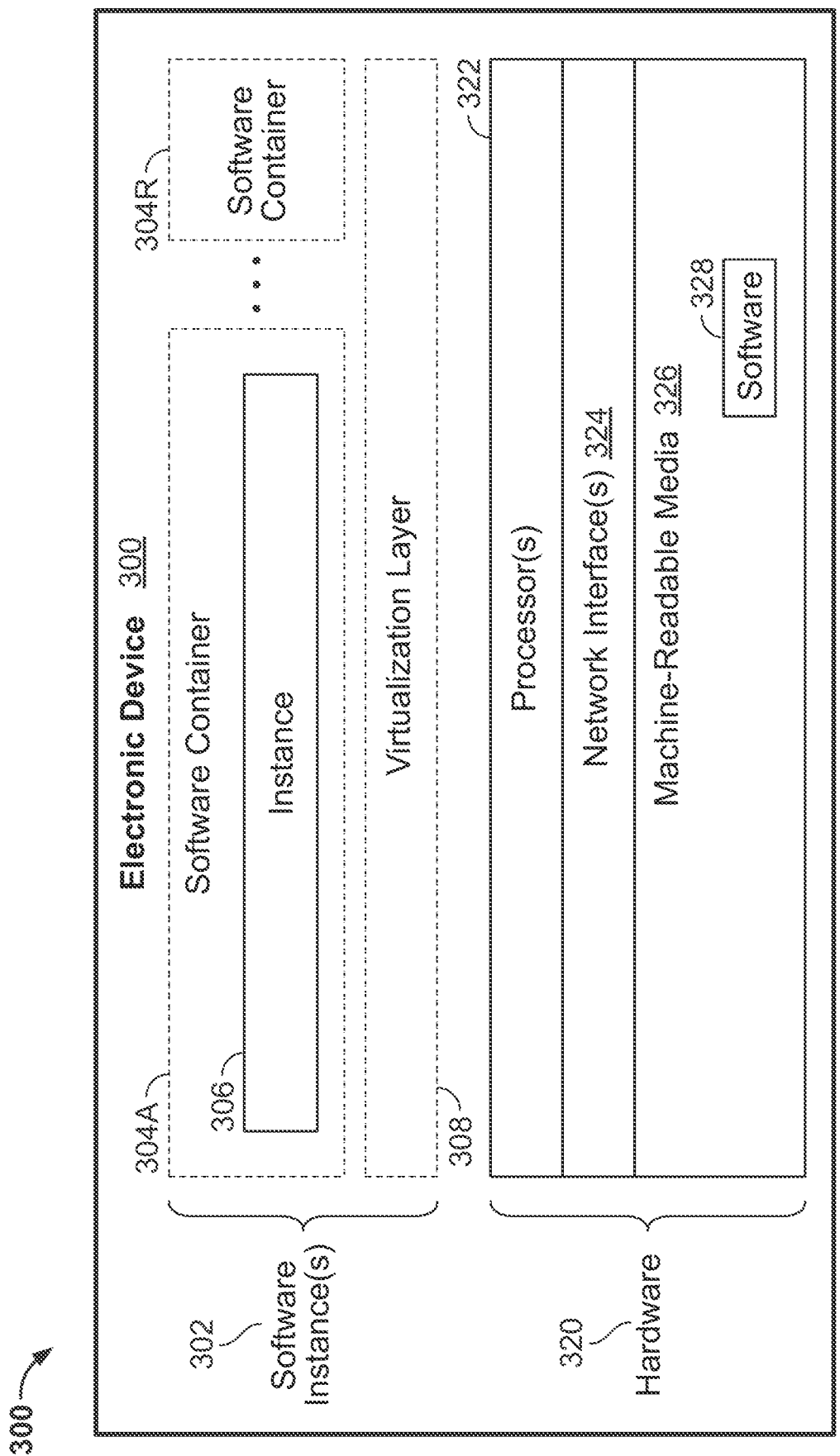
FIG. 3A is a block diagram illustrating an example electronic device according to an example implementation.

FIG. 2A is a flow diagram illustrating a computer-implemented method 200 for providing user interface functionalities, as disclosed herein. The method 200 may be performed, for example, by a system as shown in FIGS. 1A to 1C operating in conjunction with the hardware as shown in FIGS. 3A and 3B. The method 200 may include, as in step 202, providing a base design system layer including web browser components that provide platform-agnostic user interface functionalities. At 204, an API is provided that extends the base design system layer into a second design system layer that provides platform-specific user interface functionalities. At 206, a second set of extensible APIs are inherited and extended from the second design system layer, building a third design system layer using the second set of extensible APIs. Product-specific user interface functionalities are provided using the third design system layer. At 208, a third set of extensible APIs are inherited and extended from the second design system layer, building a fourth design system layer using the third set of extensible APIs. A collection of presentation-specific user interface functionalities is provided using the fourth design system layer. At 212, the base design system layer, the second design system layer, the third design system layer and the fourth design system layer are integrated into a user interface framework.

Figure 2B:
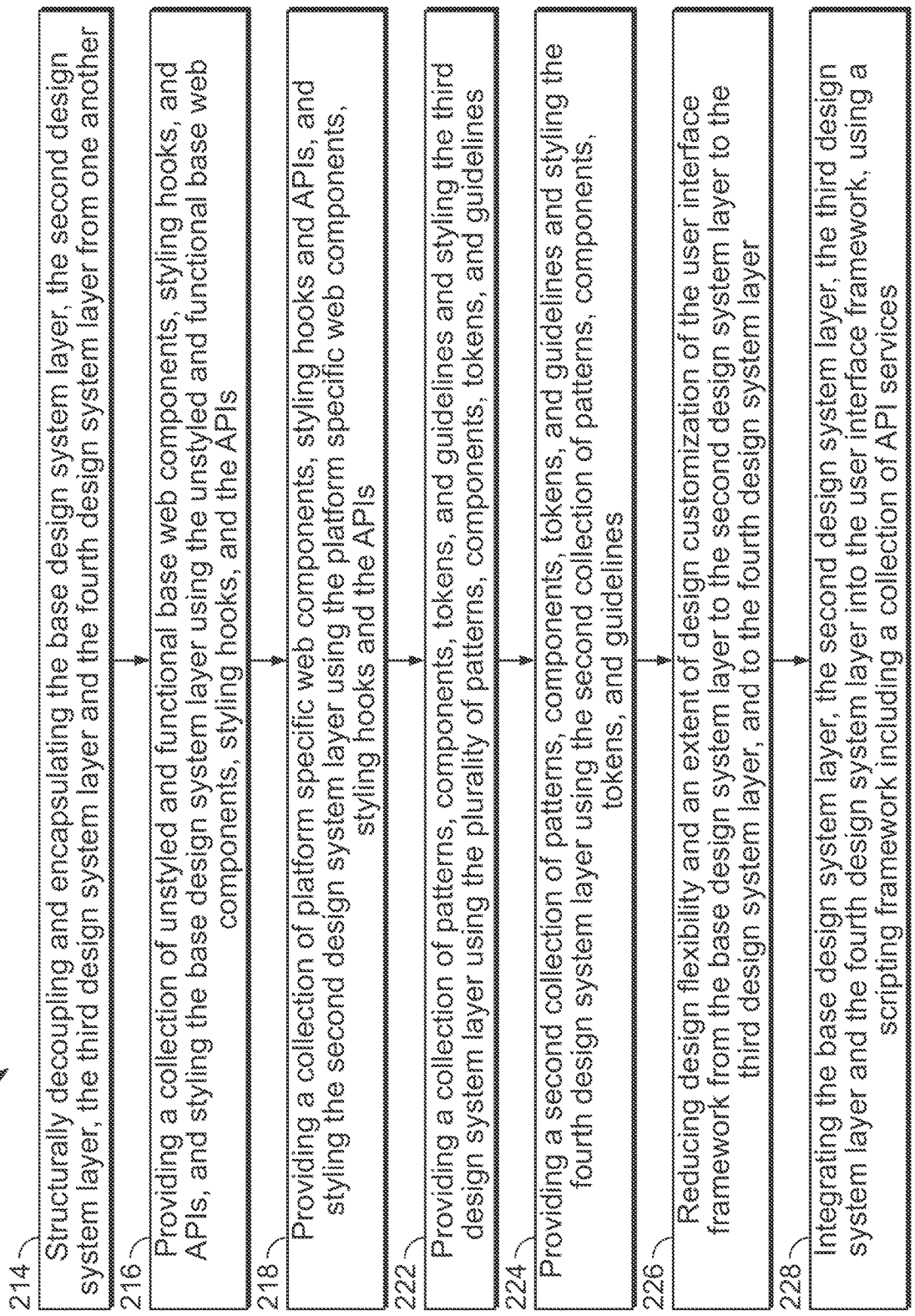
FIG. 2B is a flow diagram illustrating a method for providing user interface functionalities.

FIG. 2B is a flow diagram illustrating a computer-implemented method 200 for providing user interfaces, as disclosed herein. FIG. 2B continues the method of FIG. 2A to show how the four-layer design system 100 of FIG. 1A is deployed using a scripting framework 140 of FIG. 1B and a component architecture 180 of FIG. 1C, as previously disclosed. At 214, the base design system layer, the second design system layer, the third design system layer and the fourth design system layer are structurally decoupled and encapsulated from one another. At 216, a collection of unstyled and functional base web components, styling hooks, and APIs are provided. The base design system layer is styled using the unstyled and functional base web components, styling hooks, and the APIs. At 218, a collection of platform specific web components, styling hooks and APIs are provided. The second design system layer is styled using the platform specific web components, styling hooks and the APIs. At 222, a collection of patterns, components, tokens, and guidelines are provided. The third design system layer is styled using the collection of patterns, components, tokens, and guidelines. At 224, a second collection of patterns, components, tokens, and guidelines are provided. The fourth design system layer is styled using the second collection of patterns, components, tokens, and guidelines.

At 226, design flexibility and an extent of design customization of the user interface framework is reduced from the base design system layer to the second design system layer to the third design system layer, and to the fourth design system layer. In an example use case below, a custom web component meant for an end customer is developed from unstyled base web components. The developers, in this example, may begin with fully functional semantic base web components and then platform specific web components may be created from the base web components. Subsequently, the developers may build custom functionalities using the platform specific web components. For example, developers may customize the platform-specific components by adding custom code to "slots" in the components that are designed to allow for, but not require, such custom code. As another example, developers may use various visual themes and component parts from the platform-specific components to create their own custom components. Finally, end users may interact with the functionalities developed and customized for a consistent look and feel by the developers. The same base web components and platform specific web components may be styled in multiple different ways as the final functionality is progressively developed and customized.

Referring back to FIG. 2B, at 228, the base design system layer, the second design system layer, the third design system layer and the fourth design system layer are integrated into the user interface framework, using a scripting framework such as the scripting framework 140 of FIG. 1B. The scripting framework includes a collection of API services. The API services include web component APIs, extensible APIs, standard APIs, styling APIs, platform specific APIs and the like.

As used herein, "extensible APIs" are reusable APIs that are designed so that related individual components may be repurposed to provide new or additional features and capabilities. Extensible APIs relate to the main abstractions of different API styles and provide adaptations and/or extensions of the main abstractions. For example, in tunnel-style APIs, the main abstractions are the functions and extensibility, in this context, may mean adding new functions to an API. In resource-style APIs, the main abstractions are the resources and their representations, and extensibility may mean adding new resources, and/or extending the representations of the existing resources. In query-style APIs, the main abstractions are the schemas to be queried and extensibility may mean extending the schemas of an API.

"Standard APIs" are the default APIs provided by web platforms to their clients so that developers may adapt the clients' products and enhance them with the clients' own unique online Active Digital Identity (ADI). Further, standard APIs may be used to create and manage projects, applications, products, actions, and more platform resources.

"Styling APIs" are APIs that include declared sets of visual styling properties and a set of pre-configured ranges for objects or actions the developer needs for designing and/or developing relevant components. Component templates usually provide default visual styling properties and styling APIs may be used to enhance or redesign or reconfigure the default properties with ease.

"Platform APIs" are APIs that are invokable over a network via standard protocols such as HTTP and deployed to provide access to functionalities across a broad range of business areas (e.g., object model, structured analytics, infrastructure). Platform APIs are typically used to launch a platform, create a window and add a view, launch content in a view, configure a layout, save and restore a snapshot, and provide similar functionalities.

One or more parts of the above implementations may include software. Software is a general term whose meaning can range from part of the code and/or metadata of a single computer program to the entirety of multiple programs. A computer program (also referred to as a program) includes code and optionally data. Code (sometimes referred to as computer program code or program code) includes software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (typically, though not necessarily an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices. The term "consumer" refers to another computer service that is running the reusable software components of the system of FIG. 1.

FIG. 3A is a block diagram illustrating an electronic device 300 according to some example implementations. FIG. 3A includes hardware 320 including a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and server components may be implemented in one or more electronic devices 300. In one implementation: 1) each of the clients is implemented in a separate one of the electronic devices 300 (e.g., in end user devices where the software 328 represents the software to implement clients to interface directly and/or indirectly with server components (e.g., software 328 represents a web browser, a native client, a portal, a command-line interface, and/or an application programming interface (API) based upon protocols such as Simple Object Access Protocol (SOAP), Representational State Transfer (REST), etc.)); 2) server components is implemented in a separate set of one or more of the electronic devices 300 (e.g., a set of one or more server devices where the software 328 represents the software to implement the framework for providing additional security to protected fields in protected views); and 3) in operation, the electronic devices implementing the clients and server components would be communicatively coupled (e.g., by a network) and would establish between them (or through one or more other layers and/or other services) connections for submitting requests to server components and returning responses to the clients. Other configurations of electronic devices may be used in other implementations (e.g., an implementation in which the client and server components are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

FIG. 3B is a block diagram of a deployment environment according to some example implementations. A system 340 includes hardware (e.g., a set of one or more server devices) and software to provide service(s) 342, including server components. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

In some implementations, the system 340 is any generic network interface management system that uses web interfaces and includes server application components, client application components and a browser extension. The system and method provide for authenticating the end user via a browser extension that needs to be available in the intended user's web browser. The input to the system and method is the information about the views and its specific fields or any other part that is rendered and need to be protected, as provided by the application owner. Typical generic examples are Java clients and applications, Python based frameworks, libraries for client applications implementing the logic described above.

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. Embodiments disclosed herein may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is illustrative and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer implemented method for providing user interface functionalities, the method comprising:
    providing a base design system layer comprising a plurality of web browser components that provide platform-agnostic user interface functionalities;
    providing an application programming interface (API) that inherits and extends the base design system layer into a second design system layer that provides a plurality of platform-specific user interface functionalities;
    inheriting and extending a second plurality of extensible APIs from the second design system layer, building a third design system layer using the second plurality of extensible APIs, and providing a plurality of product-specific user interface functionalities using the third design system layer;
    inheriting and extending a third plurality of extensible APIs from the second design system layer, building a fourth design system layer using the third plurality of extensible APIs, and providing a plurality of presentation-specific user interface functionalities using the fourth design system layer;
    integrating the base design system layer, the second design system layer, the third design system layer and the fourth design system layer, through stages of parent-child extensions, into a user interface framework by using a scripting framework comprising a plurality of product specific API services that selectively calls functions of the base design system layer, the second design system layer, the third design system layer and the fourth design system layer into the user interface framework,
    wherein the scripting framework provides a path for full platform integration through the stages of parent-child extensions of the base design system layer, the second design system layer, the third design system layer and the fourth design system layer.

2. The method of claim 1 further wherein the base design system layer, the second design system layer, the third design system layer and the fourth design system layer are structurally decoupled and encapsulated from one another.

3. The method of claim 1 further comprising providing a plurality of unstyled and functional base web components, a plurality of styling hooks, and a plurality of APIs, and styling the base design system layer using the plurality of unstyled and functional base web components, a plurality of styling hooks, and a plurality of APIs.

4. The method of claim 3 further comprising providing a plurality of platform specific web components, styling hooks and a plurality of APIs, and styling the second design system layer using the plurality of platform specific web components, styling hooks and the plurality of APIs.

5. The method of claim 4 further comprising providing a plurality of patterns, components, tokens, and guidelines and styling the third design system layer using the plurality of patterns, components, tokens, and guidelines.

6. The method of claim 5 further comprising providing a second plurality of patterns, components, tokens, and guidelines and styling the fourth design system layer using the second plurality of patterns, components, tokens, and guidelines.

7. The method of claim 1, wherein a design flexibility and an extent of design customization of the user interface framework reduces from the base design system layer to the second design system layer to the third design system layer, and to the fourth design system layer.

8. The method of claim 1, wherein the plurality of product specific API services comprises web component APIs, extensible APIs, standard APIs, styling APIs, and platform specific APIs.

9. A system for providing a graphical user interface, the system comprising one or more computer processors configured to provide:
- a base design system layer comprising a plurality of web browser components that provide platform-agnostic user interface functions;
- a second design system layer comprising a plurality of extensible APIs inherited from the base design system layer that provide a plurality of platform-specific user interface functions;
- a third design system layer comprising a second plurality of extensible APIs inherited from the second design system layer that provide a plurality of product-specific user interface functions;
- a fourth design system layer comprising a third plurality of extensible APIs inherited from the second design system layer that provide a plurality of presentation-specific user interface functions,
- wherein the base design system layer, the second design system layer, the third design system layer, and the fourth design system layer are integrated, through stages of parent-child extensions, into a user interface framework by using a scripting framework comprising a plurality of product specific API services that selectively calls functions of the base the base design system layer, the second design system layer, the third design system layer and the fourth design system layer into the user interface framework,
- wherein the scripting framework provides a path for full platform integration through the stages of parent-child extensions of the base design system layer, the second design system layer, the third design system layer and the fourth design system layer.

10. The system of claim 9, wherein the base design system layer, the second design system layer, the third design system layer and the fourth design system layer are structurally decoupled and encapsulated from one another.

11. The system of claim 9, wherein the base design system layer further comprises a plurality of unstyled base web components, a plurality of styling hooks, and a plurality of APIs configured to style the plurality of unstyled base web components via the plurality of styling hooks.

12. The system of claim 11, wherein the second design system layer further comprises a plurality of platform specific web components, a second plurality of styling hooks, and a second plurality of APIs configured to style the plurality of platform specific web components via the second plurality of styling hooks.

13. The system of claim 12, wherein the third design system layer further comprises a plurality of patterns, components, tokens, and guidelines configured to provide the plurality of product-specific user interface functions.

14. The system of claim 13, wherein the fourth design system layer comprises a second plurality of patterns, components, tokens, and guidelines configured to provide the plurality of presentation-specific user interface functions.

15. The system of claim 9, wherein a design flexibility and an extent of design customization of the user interface framework reduces from the base design system layer to the second design system layer to the third design system layer, and to the fourth design system layer.

16. The system of claim 9, wherein the plurality of product specific API services comprises web component APIs, extensible APIs, standard APIs, styling APIs, and platform specific APIs.

* * * * *